(12) United States Patent
Cheng et al.

(10) Patent No.: US 11,468,688 B2
(45) Date of Patent: Oct. 11, 2022

(54) VEHICLE SENSOR DATA SHARING

(71) Applicant: Toyota Motor Engineering & Manufacturing North America, Inc., Plano, TX (US)

(72) Inventors: Bin Cheng, New York, NY (US); Hongsheng Lu, San Jose, CA (US); Rui Guo, San Jose, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 163 days.

(21) Appl. No.: 16/944,891

(22) Filed: Jul. 31, 2020

(65) Prior Publication Data
US 2022/0036098 A1 Feb. 3, 2022

(51) Int. Cl.
*G06K 9/00* (2022.01)
*G06V 20/58* (2022.01)
*G06K 9/62* (2022.01)
*G06T 5/50* (2006.01)

(52) U.S. Cl.
CPC .......... *G06V 20/58* (2022.01); *G06K 9/6288* (2013.01); *G06T 5/50* (2013.01); *G06T 2207/20221* (2013.01); *G06T 2207/30204* (2013.01)

(58) Field of Classification Search
CPC ...... G06V 20/58; G06V 10/803; G06V 20/56; G06V 10/82; G06K 9/6288; G06T 5/50; G06T 2207/20221; G06T 2207/30204
See application file for complete search history.

(56) References Cited

U.S. PATENT DOCUMENTS
10,178,531 B2   1/2019 Nguyen et al.

FOREIGN PATENT DOCUMENTS
| CN | 107438754 A | * 12/2017 | ............ B60W 30/10 |
| CN | 108496056 A | * 9/2018 | ............... G01C 3/06 |
| DE | 102016218934 A1 | 3/2018 | |
| DE | 102019001092 A1 | 3/2020 | |

OTHER PUBLICATIONS

Xiantao Jiang et al.,"Blockchain-Enabled Cross-Domain Object Detection for Autonomous Driving: A Model Sharing Approach" published May 2020, IEEE, (Year: 2020).*

* cited by examiner

*Primary Examiner* — Mekonen T Bekele
(74) *Attorney, Agent, or Firm* — Christopher G. Darrow; Darrow Mustafa PC

(57) ABSTRACT

Two vehicles—an ego vehicle and an other vehicle—can share sensor data in a streamlined manner. One or more sensors can be configured to acquire first environment data of an external environment of the ego vehicle. A data summary based on second environment data of an external environment of the other vehicle can be received. Whether there is a common region of sensor coverage between the ego vehicle and the other vehicle can be determined. In response to there being a common region, the first environment data that is located within the common region can be identified and the resolution level of the identified first environment data can be reduced. The first environment data that has the reduced resolution level and a remainder of the first environment data excluding the identified first environment data can be transmitted to the other vehicle.

20 Claims, 6 Drawing Sheets

VEHICLE SENSOR DATA SHARING

FIELD

The subject matter described herein relates in general to vehicles and, more particularly, to sharing sensor data between vehicles.

BACKGROUND

Some vehicles are equipped with sensors that can acquire information about the surrounding environment. Such information can be used for various purposes, such as detecting the presence of other vehicles on the road. In some instances, information acquired by the sensors can be used by a human driver in deciding how to navigate and/or maneuver the vehicle through the surrounding environment.

SUMMARY

In one respect, the subject matter presented herein relates to a sensor data sharing method. The method can include acquiring, using one or more sensors of an ego vehicle, first environment data of at least a portion of an external environment of the ego vehicle. The first environment data can be at an acquired resolution level. The method can include receiving, from another vehicle, a data summary based on second environment data of at least a portion of an external environment of the other vehicle. The method can include determining whether there is a common region of sensor coverage of the external environment based on the first environment data and the data summary. The method can include, in response to determining that there is a common region of sensor coverage of the external environment, identifying the first environment data that is located within the common region. The first environment data that is located within the common region can be a first portion of the first environment data. The method can include reducing a resolution level of the first portion to a reduced resolution level. The reduced resolution level can be lower than the acquired resolution level. The method can include transmitting, to the other vehicle, the first portion at the reduced resolution level and a second portion of the first environment data. The second portion being a remainder of the first environment data excluding the first portion.

In another respect, the subject matter presented herein relates to a sensor data sharing method. The method can include acquiring, using one or more sensors of an ego vehicle, first environment data of at least a portion of an external environment of the ego vehicle. The first environment data can be at an acquired resolution level. The method can include transmitting, by the ego vehicle, a data summary based on the first environment data. The method can further include receiving, by the ego vehicle and from an other vehicle, a first portion of second environment data and a second portion of the second environment data. The second environment data can be at least a portion of an external environment of the other vehicle. The resolution level of the first portion can be lower than the resolution level of the second portion. The second portion can be a remainder of the second environment data excluding the first portion. The method can include fusing the first portion, the second portion, and the first environment data.

In another respect, the subject matter presented herein relates to a sensor data sharing system. The system can include one or more sensors. The one or more sensors can be configured to acquire first environment data of at least a portion of an external environment of an ego vehicle. The first environment data can be at an acquired resolution level. The system can include one or more processors. The one or more processors can be programmed to initiate executable operations. The executable operations can include receiving, from an other vehicle, a data summary based on second environment data of at least a portion of an external environment of the other vehicle. The executable operations can further include determining whether there is a common region of sensor coverage of an external environment based on the first environment data and the data summary, and responsive to determining that there is a common region of sensor coverage of the external environment, identifying the first environment data that is located within the common region. The first environment data that is located within the common region can be a first portion of the first environment data. The executable operations can include reducing a resolution level of the first portion to a reduced resolution level. The reduced resolution level can be lower than the acquired resolution level. The executable operations can include transmitting, to the other vehicle, the first portion at the reduced resolution level and a second portion of the first environment data. The second portion can be a remainder of the first environment data excluding the first portion.

In still another respect, the subject matter described herein relates to a sensor data sharing system. The system can include one or more sensors. The one or more sensors can be configured to acquire first environment data of at least a portion of an external environment of an ego vehicle. The system can include one or more processors. The one or more processors can be programmed to initiate executable operations. The executable operations can include transmitting, by the ego vehicle, a data summary based on the first environment data. The executable operations can include receiving, by the ego vehicle and from an other vehicle, a first portion of second environment data and a second portion of the second environment data. The second environment data can be at least a portion of an external environment of the other vehicle. The resolution level of the first portion can be lower than the resolution level of the second portion. The second portion can be a remainder of the second environment data excluding the first portion. The executable operations can include fusing together the first portion at the enhanced resolution level, the second portion, and the first environment data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
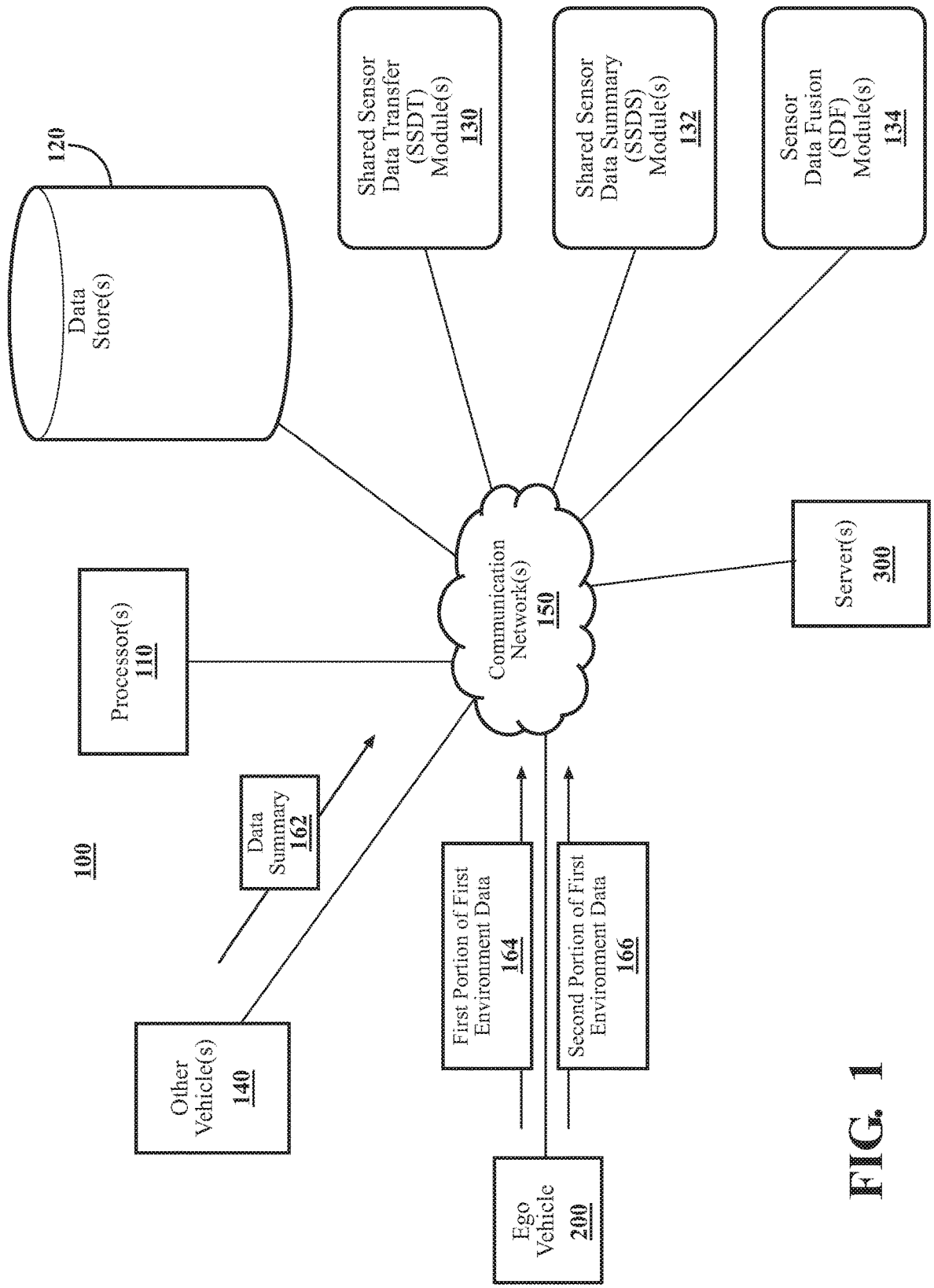
FIG. 1 is an example of a sensor data sharing system.

Vehicles travelling on a road can share sensor data with other vehicles so as to broaden their sensor view of their external environment. Sensor data can be wirelessly transmitted and/or received between the vehicles. However, a vehicle may transmit sensor data that is already available to the receiving vehicle, unnecessarily consuming communication bandwidth to transfer redundant sensor data. Time spent processing sensor data may be extended by processing redundant sensor data.

According to arrangements herein, data sharing between vehicles can be facilitated to minimize the transfer and processing of redundant sensor data. As an example, an ego vehicle and an other vehicle can share sensor data in a streamlined manner. One or more sensors of the ego vehicle can be configured to acquire first environment data of an external environment of the ego vehicle. One or more sensors of the other vehicle can be configured to acquire second environment data of an external environment of the other vehicle. The other vehicle can transmit a data summary based on the second environment data to the ego vehicle and/or a server. In some instances, the ego vehicle can transmit the first environment data to the server.

The ego vehicle and/or the server can receive the data summary based on the external environment of the other vehicle. The ego vehicle and/or the server can determine whether there is a common region between the external environment of the ego vehicle and the data summary received from the other vehicle. In the case that there is a common region, the ego vehicle and/or the server can downsample and/or compress the sensor data in the common region so as to reduce redundant sensor data being transferred from the ego vehicle to the other vehicle. The ego vehicle and/or the server can transmit the downsampled and/or compressed sensor data along with the remaining sensor data to the other vehicle. The other vehicle can receive the downsampled and/or compressed sensor data and the remaining sensor data from the ego vehicle. The other vehicle can fuse the received sensor data with second environment data to broaden the other vehicle's field of view.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a sensor data sharing (SDS) system 100. Some of the possible elements of the SDS system 100 are shown in FIG. 1 and will now be described. It will be understood that it is not necessary for the SDS system 100 to have all of the elements shown in FIG. 1 or described herein. The SDS system 100 can include one or more processors 110, one or more data stores 120, one or more shared sensor data transfer (SSDT) modules 130, one or more shared sensor data summary (SSDS) modules 132, one or more sensor data fusion (SDF) modules 134, one or more other vehicles 140, an ego vehicle 200, and/or one or more servers 300.

The various elements of the SDS system 100 can be communicatively linked through one or more communication networks 150. As used herein, the term "communicatively linked" can include direct or indirect connections through a communication channel or pathway or another component or system. A "communication network" means one or more components designed to transmit and/or receive information from one source to another. The communication network(s) 150 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 150 further can be implemented as or include one or more wireless networks, whether short or long range. For example, in terms of short-range wireless networks, the communication network(s) 150 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. The communication network(s) 150 can include dedicated short-range communications (DSRC) technology and/or millimeter wave communications technology. The short-range wireless network can be operatively connected to the parking area. In terms of long-range wireless networks, the communication network(s) 150 can include a mobile, cellular, and or satellite-based wireless network and support voice, video, text, and/or any combination thereof. Examples of long-range wireless networks can include GSM, TDMA, CDMA, WCDMA networks or the like. The communication network(s) 150 can include wired communication links and/or wireless communication links. The communication network(s) 150 can include any combination of the above networks and/or other types of networks. The communication network(s) 150 can include one or more routers, switches, access points, wireless access points, and/or the like. In one or more arrangements, the communication network(s) 150 can include Vehicle-to-Vehicle (V2V), Vehicle-to-Infrastructure (V2I), or Vehicle-to-Everything (V2X) technology, which can allow for communications between the ego vehicle 200 and the server(s) 300 and/or the other vehicle(s) 140. One or more elements of the SDS system 100 include and/or can execute suitable communication software, which enables two or more of the elements to communicate with each other through the communication network(s) 150 and perform the functions disclosed herein.

The SDS system 100 can include one or more processors 110. "Processor" means any component or group of components that are configured to execute any of the processes described herein or any form of instructions to carry out such processes or cause such processes to be performed. The processor(s) 110 can be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors 110 can work in combination with each other. In one or more arrangements, one or more processors 110 can be a main processor(s) of the vehicle. For instance, one or more processors 110 can be electronic control unit(s) (ECU).

The SDS system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The SDS system 100 can include an ego vehicle 200 and one or more other vehicles 140. It should be noted that the ego vehicle 200 and the other vehicle(s) 140 can be configured to perform the various functionalities described herein. Depending on the particular transaction, the ego vehicle 200 may use some portion of these functionalities, and the other vehicle(s) 140 can use another portion of these functionalities. The term "ego" is used for convenience to indicate that the description is from the point of view of that particular vehicle. Thus, while one vehicle may be the ego vehicle in one instance, the same vehicle may be considered to be an other vehicle in another instance, depending on the point of view being discussed.

The other vehicle 140 can be any vehicle that is that is communicatively coupled to the ego vehicle 200 and/or to the server 300. As used in connection with the ego vehicle 200 and the other vehicle(s) 140, the term "vehicle" means any form of motorized transport, now known or later developed. Non-limiting examples of vehicles include automobiles, motorcycles, aerocars, or any other form of motorized transport. While arrangements herein will be described in connection with land-based vehicles, it will be appreciated that arrangements are not limited to land-based vehicles. Indeed, in some arrangements, the vehicle can be water-based or air-based vehicles. The ego vehicle 200 and/or the other vehicle(s) 140 may be operated manually by a human driver, semi-autonomously by a mix of manual inputs from a human driver and autonomous inputs by one or more vehicle computers, fully autonomously by one or more vehicle computers, or any combination thereof. The ego vehicle 200 and/or the other vehicle 140 can include a portion of or all the functionality described herein. In some arrangements, the ego vehicle 200 and/or the other vehicle 140 can perform all of the functions described herein, or a subset of all the functions.

The SDS system 100 can include one or more servers 300. In some arrangements, the server(s) 300 can be cloud-based server(s). The server(s) 300 can communicate with the ego vehicle 200 and/or with one or more other vehicles 140 over a communication network 150, such as by any type of vehicle-to-cloud (V2C) communications, now known or later developed. The server(s) 300 can communicate with other servers.

It should be noted that the processor(s) 110, the data store(s) 120, the SSDT module(s) 130, the SSDS module(s) 132 and/or the SDF module(s) 134 can be located on the ego vehicle 200 and/or the other vehicle(s) 140. In some arrangements, the processor(s) 110, the data store(s) 120, the SSDT module(s) 130, the SSDS module(s) 132 and/or the SDF module(s) 134 can be located on the server(s) 300. In some arrangements, the processor(s) 110, the data store(s) 120, the SSDT module(s) 130, the SSDS module(s) 132 and/or the SDF module(s) 134 can be located remote from the ego vehicle 200, the other vehicle(s) 140, and/or the server(s) 300. In some arrangements, the processor(s) 110, the data store(s) 120, the SSDT module(s) 130, the SSDS module(s) 132 and/or the SDF module(s) 134 can be located on any combination of the above.

The processor(s) 110, the data store(s) 120, the SSDT module(s) 130, the SSDS module(s) 132 and/or the SDF module(s) 134 will described from the perspective of the ego vehicle 200. In the SDS system 100, the SSDT module(s) 130 can be configured to acquire from one or more sensors of the ego vehicle 200 first environment data of at least a portion of an external environment of the ego vehicle 200. The first environment data can include information or data on the portion of the external environment of the ego vehicle 200, including any objects therein. The first environment data can include information about objects in the external environment. As an example, the first environment data can include position, speed, heading angle, acceleration, or any combination thereof about an object. The first environment data can include any other information about the external environment, including the above-noted information about the objects and/or additional information about the objects. As an example, the first environment data can include camera data of an object in the external environment. The first environment data can include a time stamp indicating when the first environment data was captured. The first environment data can be for a single moment in time, multiple moments in time, or over a period of time. The first environment data can be acquired using one or more sensors of the ego vehicle 200. The sensor(s) in the ego vehicle 200 are described in detail below. The first environment data can be sent and/or received in any suitable manner. For example, the first environment data can be raw sensor data. In some instances, the first environment data can be a subset (e.g., less than all) of all first environment data acquired by the sensors at a moment in time.

The first environment data can be received by the SSDT module(s) 130 at an acquired resolution level. The acquired resolution level of the first environment data can be spatial resolution and/or temporal resolution. Spatial resolution can refer to the accuracy or precision of an image. As an example, the resolution level of the first environment data can refer to the pixel count of images in the first environment data. Temporal resolution can refer to the number of images captured within a time period. The acquired resolution level can be based on a resolution capability of the capturing sensor(s). The acquired resolution level can refer to the overall data size of the first environment data, as acquired by the sensor(s) of the ego vehicle 200. Alternatively and/or additionally, the acquired resolution level can be based on the storage capability of the data store(s) and/or any suitable storage unit.

The SSDT module(s) 130 can be configured to receive a data summary 162 based on second environment data from the other vehicle(s) 140. The second environment data can include information or data on at least a portion of an external environment of the other vehicle(s) 140. The data summary 162 can include information about one or more objects detected in the second environment data. The information about the detected objects can include the size of the object(s), the color(s) of the object(s), the category of the object(s), a bounding box around the object(s), and/or the position of the object(s) relative position to the other vehicle(s) 140. The data summary 162 can include information about the sensor(s) used to capture the second environment data, such as the sensor type, standard or real-time detection ranges, and/or the sensor field of view. The data summary 162 can include a time stamp indicating when the information about the detected objects was captured. The data summary 162 can be in text format, tabulated format and/or image format. The data summary 162 can be sent in any suitable manner.

The SSDT module(s) 130 can be configured to determine whether there is a common region of sensor coverage of the external environment based on the first environment data and the data summary. "Common region of sensor coverage of the external environment" is a region of the external environment in which there is an overlap of data captured by the sensors of the ego vehicle 200 and the sensors of the other vehicle(s) 140. The overlap can be a spatial and/or temporal overlap. Upon acquiring the first environment data and the data summary 162, the SSDT module(s) 130 can determine whether there are detected objects that are present in both the first environment data and the data summary 162. As an example, the SSDT module(s) 130 can analyze the first environment data for detected objects identified in the data summary 162. In one or more arrangements, the SSDT module(s) 130 can compare images in the first environment data to images in the data summary 162 using any suitable technique, including, for example, template matching and other kinds of computer vision and/or image processing techniques and/or other artificial or computational intelligence algorithms or machine learning methods. The SSDT module(s) 130 can include any suitable object recognition software. In one or more arrangements, the SSDT module(s) 130 can analyze the first environment data for detected objects identified in the data summary 162 by at least, object size, object color, and object category. In cases where the objects in the first environment data have been annotated, the SSDT module(s) 130 can analyze the associated annotations for the detected objects for a match to the detected objects of the data summary 162. In one or more arrangements, the SSDT module(s) 130 can determine the common region based on the sensor coverage area. In such case, the SSDT module(s) 130 can overlay the sensor coverage area of the ego vehicle 200 and the sensor coverage area of the other vehicle(s) 140 to identify the common region based on where the portions of the sensor coverage areas of the ego vehicle 200 and other vehicle(s) 140 overlap.

In one or more arrangements, the SSDT module(s) 130 can be configured to estimate an area of spatial-temporal correlation between the one or more sensors of the ego vehicle 200 and the one or more sensors of the other vehicle(s) 140. In such arrangements, the SSDT module(s) 130 can align the sensor data from the sensors of the ego vehicle 200 and the other vehicle(s) 140 based on the time stamps of the sensor data. Additionally and/or alternatively, the SSDT module(s) 130 can align the sensor data from the sensors of the ego vehicle 200 and the other vehicle(s) 140 based on sensor type, the sensor field of view and/or GPS data associated with the sensor data. The SSDT module(s) 130 can be configured to align the data that is temporally correlated. For instance, the SSDT module(s) 130 can be configured to align sensor data that was captured at the same time stamp or within a predetermined time period (e.g., within 5 seconds or less, 4 seconds or less, 3 seconds or less, 2 seconds or less, 1 second or less, etc.)

In some instances, the SSDT module(s) 130 may not find a common region of sensor coverage of the external environment based on the first environment data and the data summary 162. In such a case, there may be no redundant sensor data between the ego vehicle 200 and the other vehicle(s) 140. In some arrangements, where there is no common region of sensor coverage of the external environment, the SSDT module(s) 130 can transmit at least a portion of the first environment data to the other vehicle(s) 140. The SSDT module(s) 130 can transmit the at least portion of the first environment at the acquired resolution. Alternatively, the SSDT module(s) 130 can transmit the at least portion of the first environment at a resolution that is lower than the acquired resolution.

In the case where the SSDT module(s) 130 determines there is a common region of sensor coverage of the external environment, the SSDT module(s) 130 can identify the first environment data that is located within the common region of sensor coverage. The SSDT module(s) 130 can determine a perimeter or boundary of the common region by, as an example, overlapping an image of the first environment data with the data summary 162 in the image format. The SSDT module(s) 130 can align the images based on the detected objects present in both the first environment data and the data summary 162. The SSDT module(s) 130 can compare the objects in the overlapping images and identify the boundary of the common region based on the areas where the overlapping images do not or no longer match. The SSDT module(s) 130 can identify a first portion 164 of the first environment data that is located within the boundary of the common region. The SSDT module(s) 130 can be configured to identify a second portion 166 of the first environment data. The second portion 166 can be the first environment data that remains after the first portion 164 is excluded.

The SSDT module(s) 130 can be configured to reduce a resolution level of the first portion 164 to a reduced resolution level. The reduced resolution level can be lower than the acquired resolution level. Thus, the first portion 164 at the reduced resolution would not include as much information as the first portion 164 at the acquired resolution. Further, the amount of sensor data in the first portion 164 at the reduced resolution level can be less than the amount of sensor data in the first portion 164 at the acquired resolution level.

The SSDT module(s) 130 can be configured to reduce the resolution level of the first portion 164 to the reduced resolution level in any suitable manner. For instance, the SSDT module(s) 130 can be configured to reduce the resolution level of the first portion 164 to the reduced resolution level by downsampling the first portion 164 to the reduced resolution level. Downsampling can be performed using any suitable feature extractor, now known or later developed. As an example, the SSDT module(s) 130 can utilize a neural network encoder to extract features such as a size, color, and/or shape of detected objects(s). The first portion 164 at the reduced resolution level can be limited to the edge information of detected objects in the first portion 164. In such an example, the SSDT module(s) 130 can detect object edges, borders, outlines and/or outer surfaces in the first portion 164 by using edge detection algorithms that include a Sobel operator and/or a Canny edge detector. As another example, the SSDT module(s) 130 can detect other features of the detected objects in the first environment data using fast image filter algorithm(s). Additionally and/or alternatively, the SSDT module(s) 130 can employ any other suitable downsampling technique such as decimation.

In some instance, the SSDT module(s) 130 can be configured to compress the first portion 164. The SSDT module(s) 130 can utilize any suitable compression algorithm, now known or later developed, such as discrete cosine transform (DCT). Additionally and as an example, the SSDT module(s) 130 can be configured to compress the second portion 166 of the first environment data, where the second portion 166 can be a remainder of the first environment data that excludes the first portion 164.

The SSDT module(s) 130 can be configured to transmit, to the other vehicle(s) 140, the first portion 164 at the reduced resolution level and the second portion 166. As an example, the SSDT module(s) 130 can transmit the first portion 164 that can be limited to edge information of the detected objects in the first environment data located in the common region of sensor coverage, and the second portion 166. The resolution of the second portion 166 can be as low as the reduced resolution of the first portion 164, as high as the acquired resolution, or anything in between. The SSDT module(s) 130 can cause the first portion 164 at the reduced resolution and the second portion 166 to be transmitted to the other vehicle(s) 140 over the communication network(s) 150 using as an example, millimeter wave communications.

In the SDS system 100, the SSDS module(s) 132 can be configured to determine a data summary 162 based on acquired environment data. The SSDS module(s) 132 can be configured to acquire, from one or more sensors of the ego vehicle 200, the first environment data of at least a portion of an external environment of the ego vehicle 200.

The SSDS module(s) 132 can, in one or more arrangements, attempt to classify the type, nature, and/or identity of the object(s) detected in the first environment data. The SSDS module(s) 132 can further determine information about the sensor(s) that detected the objects in the first environment data such as the type of sensor(s), the field of view of the sensor(s), and the distance between the detected object(s) and the sensor(s).

The SSDS module(s) 132 can attempt to classify the detected object in any suitable manner. For instance, in one or more arrangements, the SSDS module(s) 132 can include and/or have access to an object image database, which can be stored in the data store(s) 120 or in one or more remote data stores. The object image database can include one or more images of a plurality of different objects, including people, animals, buildings, traffic signs, and/or vehicles. The images can be of at least a portion of a plurality of different objects.

The SSDS module(s) 132 can analyze first environment data captured by the sensor(s) to classify objects detected therein. The SSDS module(s) 132 can use any suitable technique, including, for example, template matching and other kinds of computer vision and/or image processing techniques and/or other artificial or computational intelligence algorithms or machine learning methods. The SSDS module(s) 132 can include any suitable object recognition software. The SSDS module(s) 132 can query the object image database for possible matches. For instance, images in the first environment data can be compared to images in the object image database for possible matches. Alternatively or in addition, measurements or other aspects of the image can be compared to measurements or other aspects of any images in the object image database. The SSDS module(s) 132 can classify the detected object as a particular type of object if there is a match between the captured image and an image in the object database. "Match" or "matches" means that an image or other information in the first environment data and one or more of the images in the object image database are substantially identical. For instance, an image or other information collected by the sensor(s) and one or more of the images in the object image database can match within a predetermined probability (e.g., at least about 85%, at least about 90%, at least about 95% or greater) or confidence level. In one or more arrangements, the detected object can be compared to identifying features of an object, such as color measured visually, shape, size, movement, sounds, etc.

The SSDS module(s) 132 can output classification data for the detected objects for inclusion in the data summary 162. The classification data can be in any suitable format such as text, image, and/or a tabulated format. As an example, in the data summary 162, the classification data for a detected object can include the type and/or category of the object, the color of the object, the size of the object, a bounding box around the object, the position of the object relative to the ego vehicle 200, a timestamp, and/or information on the sensor(s) that detected the object as described above.

The SSDS module(s) 132 can be configured to cause the data summary 162 to be transmitted by the ego vehicle 200. The SSDS module(s) 132 can transmit the data summary 162 to an other vehicle 140. Additionally and/or alternatively, the SSDS module(s) 132 can transmit the data summary 162 to an entity such as a server 300. The SSDS module(s) 132 can transmit the data summary 162 to the other vehicle(s) 140 or another entity using the transceiver(s) and the communication network(s) 150. As an example, the SSDS module(s) 132 can broadcast the data summary 162.

In the SDS system 100, the SDF module(s) 134 can be configured to receive, by the ego vehicle 200 and from an other vehicle 140, a first portion 164 of second environment data at a first resolution level and a second portion 166 of the second environment data at a second resolution level. The second environment data can be at least a portion of an external environment of the other vehicle 140 captured by the sensors(s) of the other vehicle 140, and the second portion 166 can be a remainder of the second environment data, if any, excluding the first portion 164. The first resolution level can be lower than the second resolution level. The first resolution level can be lower than the acquired resolution level, which is the resolution level at which the sensor(s) of the other vehicle 140 captured the second environment data. Additionally and/or alternatively, the second resolution level can be as low as the first resolution level, as high as the acquired resolution level, or resolution level between the first resolution level and the acquired resolution level. The SDF module(s) 134 can receive the first portion 164 and the second portion 166 of the second environment data using the transceiver(s) and the communication network(s) 150.

In some arrangements, the first portion 164 can be compressed. Such compression can be performed by the SSDT module(s) 130 of the other vehicle 140. The SDF module(s) 134 can be configured to decompress the first portion 164. Additionally, the second portion 166 can be compressed and the SDF module(s) 134 can be configured to decompress the second portion 166. The SDF module(s) 134 can utilize a neural network encoder/decoder and/or any suitable decompression methods such as discrete cosine transform (DCT).

The SDF module(s) 134 can be configured to fuse the first portion 164 of the second environment data at the first resolution level, the second portion 166 of the second environment data, and the first environment data. As an example, the SDF module(s) 134 can fuse the first portion 164 of the second environment data, the second portion 166 of the second environment data, and the first environment data by aligning markers in the first portion 164 of the second environment data and the first environment data. Markers can be detected objects that are present in the first portion 164 of the second environment data and the first environment data. The SDF module(s) 134 can overlay the first portion 164 of the second environment data over the first environment data such that the detected objects present in both the first portion 164 of the second environment data and the first environment data are aligned. Upon aligning the first portion 164 of the second environment data and the first environment data, the SDF module(s) 134 can fuse the first and second environment data based on the alignment.

Figure 2:
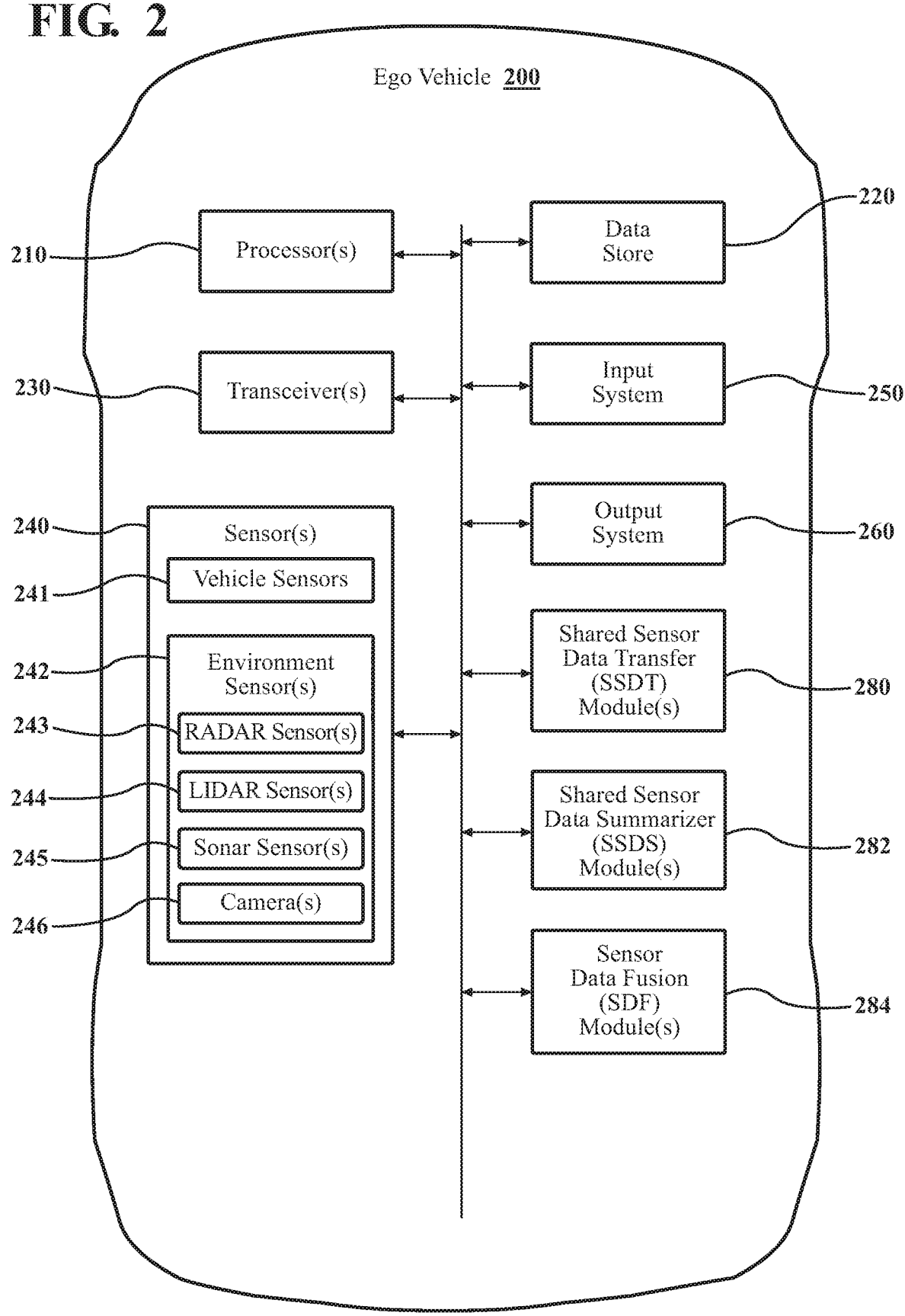
FIG. 2 is an example of an ego vehicle.

The ego vehicle 200 will now be described in greater detail. Referring to FIG. 2, an example of the ego vehicle 200 is shown. In some instances, the ego vehicle 200 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the ego vehicle 200 can be manual, semi-autonomous, highly autonomous, or fully automated.

The ego vehicle 200 can include one or more processors 210 and one or more data stores 220. The above discussion of the processors 110 and data stores 120 applies equally to the processors 210 and data stores 220, respectively.

The ego vehicle 200 can include one or more transceivers 230. As used herein, "transceiver" is defined as a component or a group of components that transmit signals, receive signals or transmit and receive signals, whether wirelessly or through a hard-wired connection. The transceiver(s) 230 can enable communications between the ego vehicle 200 and other elements of the SDS system 100. The transceiver(s) 230 can be any suitable transceivers used to access a network, access point, node or other device for the transmission and receipt of data. The transceiver(s) 230 may be wireless transceivers using any one of a number of wireless technologies, now known or in the future.

The ego vehicle 200 can include one or more sensors 240. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the ego vehicle 200 includes a plurality of sensors, the sensors can work independently from each other. Alternatively, two or more of the sensors can work in combination with each other. In such case, the two or more sensors can form a sensor network.

The sensor(s) 240 can include any suitable type of sensor. Various examples of different types of sensors will be described herein. However, it will be understood that the embodiments are not limited to the particular sensors described.

The sensor(s) 240 can include one or more vehicle sensors 241. The vehicle sensor(s) 241 can detect, determine, assess, monitor, measure, quantify and/or sense information about the ego vehicle 200 itself (e.g., position, orientation, speed, etc.). The sensor(s) 240 can include one or more environment sensors 242 configured to detect, determine, assess, monitor, measure, quantify, acquire, and/or sense data or information about the external environment in which a vehicle is located or one or more portions thereof. For example, the environment sensor(s) 242 can detect, determine, assess, monitor, measure, quantify, acquire, and/or sense obstacles in at least a portion of the external environment of the ego vehicle 200 and/or information/data about such obstacles. Such obstacles may be stationary objects and/or dynamic objects. The environment sensors 242 can detect, determine, assess, monitor, measure, quantify, acquire, and/or sense other things in the external environment of the ego vehicle 200, such as, for example, lane markers, signs, traffic lights, traffic signs, lane lines, crosswalks, curbs proximate the ego vehicle 200, off-road objects, etc. Data acquired by the environment sensor(s) 242 of the ego vehicle 200 will be referred to herein as "first environment data."

In one or more arrangements, the environment sensor(s) 242 can include one or more radar sensors 243, one or more LIDAR sensors 244, one or more sonar sensors 245, and/or one or more cameras 246. Such sensors can be used to detect, determine, assess, monitor, measure, quantify, acquire, and/or sense, directly or indirectly, something about the external environment of the ego vehicle 200. For instance, one or more of the environment sensors 242 can be used to detect, determine, assess, monitor, measure, quantify, acquire, and/or sense, directly or indirectly, the presence of one or more objects in the external environment of the ego vehicle 200, the position or location of each detected object relative to the ego vehicle 200, the distance between each detected object and the ego vehicle 200 in one or more directions (e.g. in a longitudinal direction, a lateral direction, and/or other direction(s)), the elevation of a detected object, the speed of a detected object, the acceleration of a detected object, the heading angle of a detected object, and/or the movement of each detected obstacle.

The ego vehicle 200 can include an input system 250. An "input system" includes any device, component, system, element or arrangement or groups thereof that enable information/data to be entered into a machine. The input system 250 can receive an input from a vehicle occupant (e.g. a driver or a passenger). Any suitable input system 250 can be used, including, for example, a keypad, display, touch screen, multi-touch screen, button, joystick, mouse, trackball, microphone and/or combinations thereof.

The ego vehicle 200 can include an output system 260. An "output system" includes any device, component, system, element or arrangement or groups thereof that enable information/data to be presented to a vehicle occupant (e.g. a person, a vehicle occupant, etc.). The output system 260 can present information/data to a vehicle occupant. The output system 260 can include a display. Alternatively or in addition, the output system 260 may include an earphone and/or speaker. Some components of the ego vehicle 200 may serve as both a component of the input system 250 and a component of the output system 260.

The ego vehicle 200 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data store 220 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The ego vehicle 200 can include one or more SSDT module(s) 280, one or more SSDS module(s) 282, and one or more SDF module(s) 284. The above discussion of the SSDT module(s) 130, the SSDS module(s) 132, and the SDF module(s) 134 in connection with FIG. 1 applies equally here. It should be noted that, similar to the ego vehicle 200, the other vehicle 140 can include one or more SSDT module(s) 280, one or more SSDS module(s) 282, and one or more SDF module(s) 284.

Figure 3:
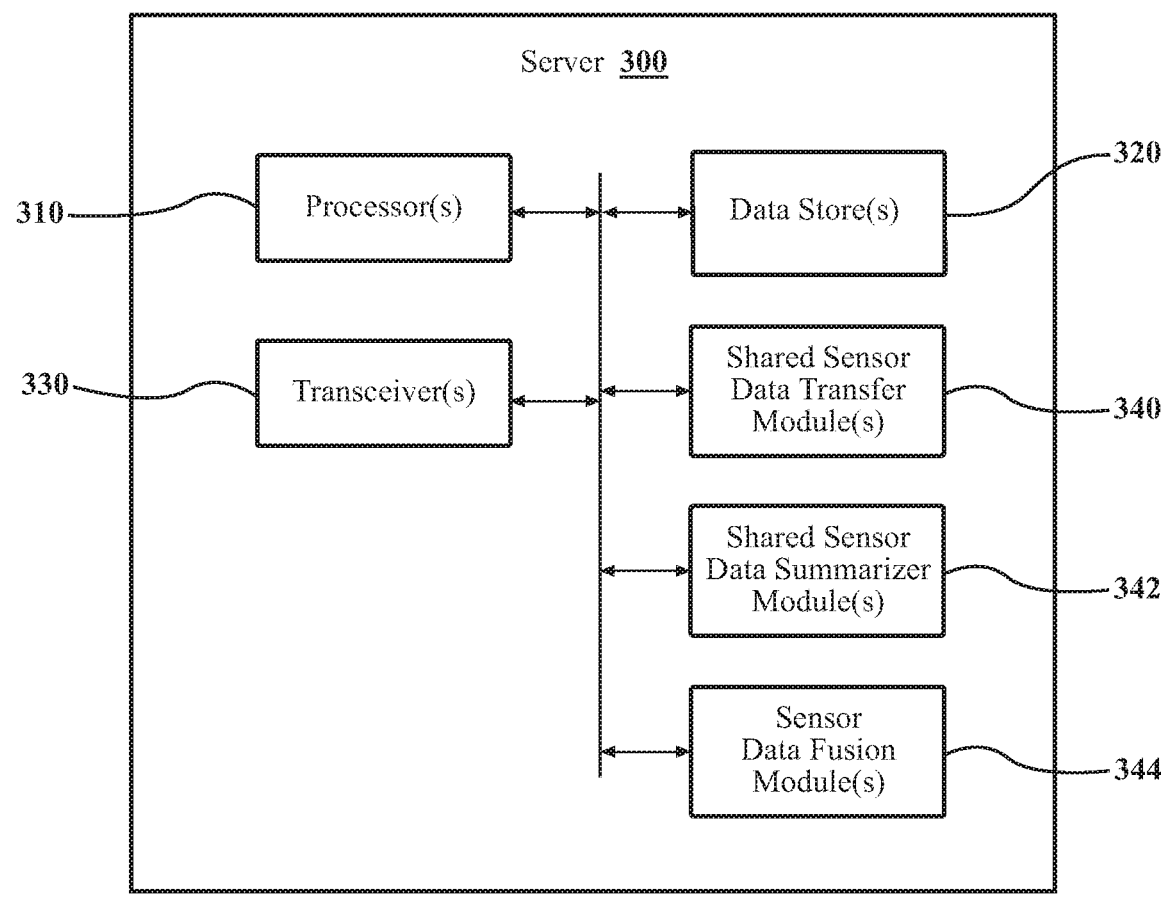
FIG. 3 is an example of a server.

Referring to FIG. 3, an example of a server 300 is shown. The server 300 can include one or more processors 310, one or more data stores 320, one or more transceivers 330, one or more SSDT module(s) 340, one or more SSDS module(s) 342, and one or more SDF module(s) 344. The above description of the one or more processors 110, the one or more data stores 120, the SSDT module(s) 130, the SSDS module(s) 132, and the SDF module(s) 134 in connection with the SDS system 100 of FIG. 1 applies equally to the respective elements of the server 300. Likewise, the above description of the processor(s) 210, the data store(s) 220, and the transceiver(s) 230 in connection with the ego vehicle 200 applies equally to the respective elements of the server 300.

Now that the various potential systems, devices, elements and/or components of the SDS system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 4:
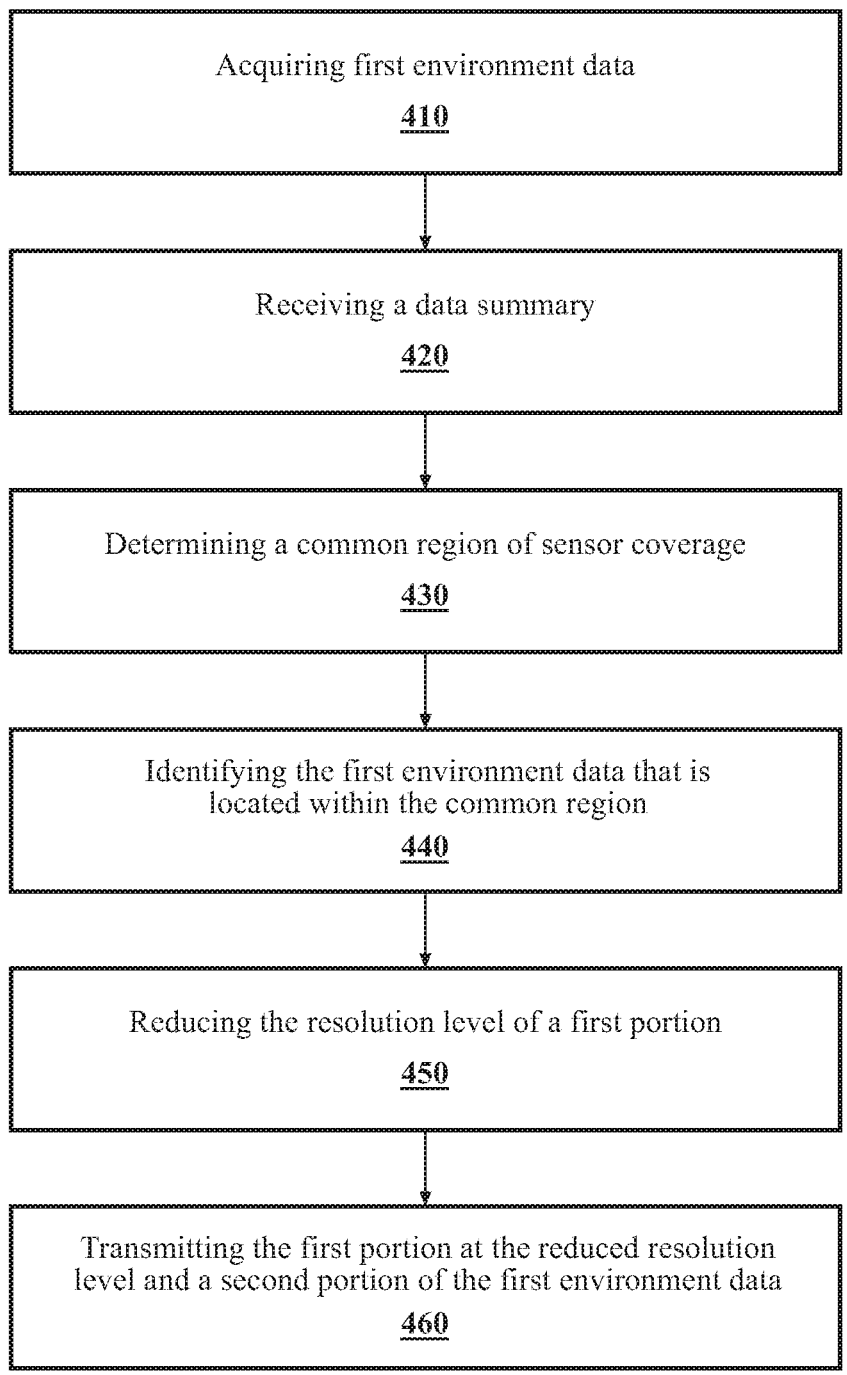
FIG. 4 is an example of a vehicle-based method for sharing sensor data.

Turning to FIG. 4, an example of a vehicle-based method 400 for sharing sensor data is shown. The method 400 is presented from the point of view of an ego vehicle that transmits sensor data, a portion of which is in a compressed format, to an other vehicle. At block 410, first environment data can be acquired for at least a portion of an external environment of the ego vehicle 200 at an acquired resolution level. The first environment data can be acquired by one or more of the environment sensors 242 of the ego vehicle 200. The method 400 can continue to block 420.

At block 420, a data summary 162 based on second environment data of at least a portion of an external environment of an other vehicle can be received, such as by the transceiver(s) 230 or the ego vehicle 200. The data summary 162 can be received in response to a request, unilaterally sent by the other vehicle, or at any other time. The method 400 can continue to block 430.

At block 430, it can be determined whether there is a common region of sensor coverage of the external environment based on the first environment data and the data summary 162. Such a determination can be made by the SSDT module(s) 280 and/or the processor(s) 210. The method 400 can continue to block 440.

At block 440, in response to determining that there is a common region of sensor coverage of the external environment, the first environment data that is located within the common region of sensor coverage can be identified. The identifying can be performed by the SSDT module(s) 280 and/or the processor(s) 210. The first environment data that is located within the common region can be referred to as the first portion of the first environment data. The method 400 can continue to block 450.

At block 450, a resolution level of the first portion of the first environment data can be reduced to a reduced resolution level. The reducing can be performed by the SSDT module(s) 280 and/or the processor(s) 210 using, as an example, downsampling and/or compression techniques. The reduced resolution level can be lower than the acquired resolution level. The method can continue to block 460.

At block 460, the first portion at the reduced resolution level and a second portion of the first environment data, which is a remainder of the first environment data excluding the first portion, can be transmitted to the other vehicle. The transmitting can be performed by the SSDT module(s) 280 and/or the processor(s) 210, and/or the transceiver(s) 230. The method 400 can end. Alternatively, the method 400 can return to block 410 or some other block. The method 400 can be repeated at any suitable point, such as at a suitable time or upon the occurrence of any suitable event or condition.

Figure 5:
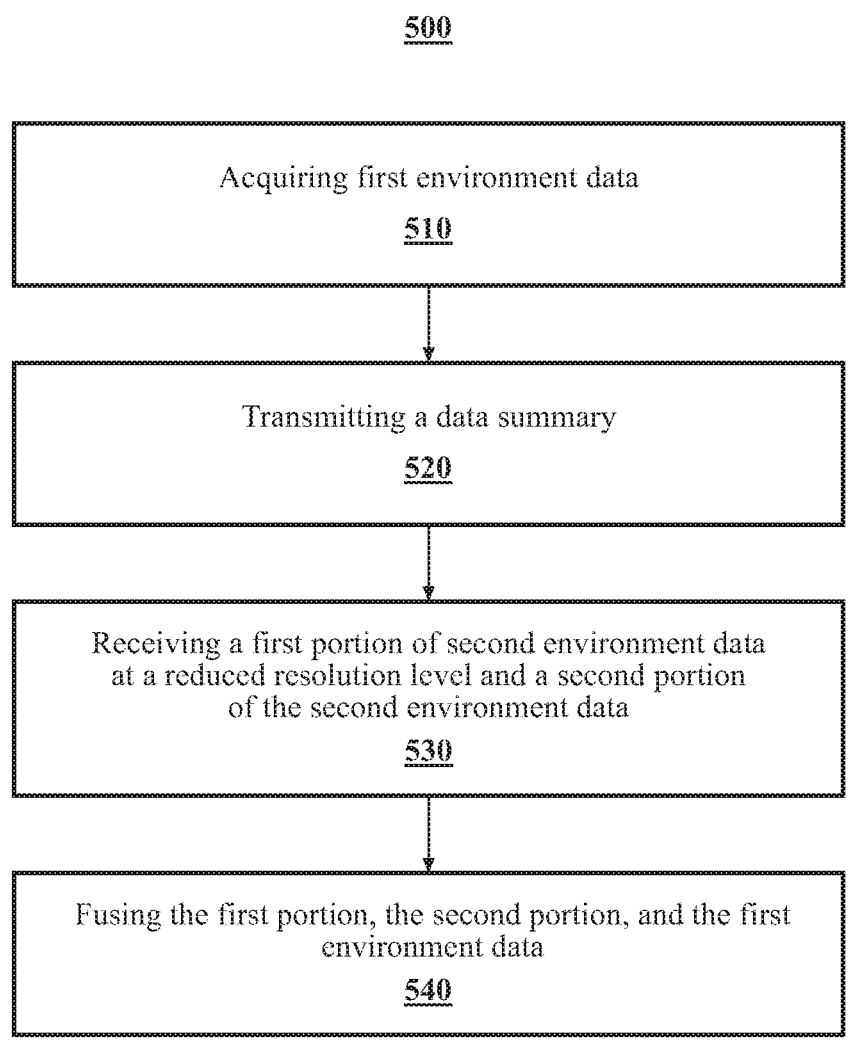
FIG. 5 is another example of a vehicle-based method for sharing sensor data.

Turning to FIG. 5, another example of a vehicle-based method 500 for sharing sensor data is shown. It should be noted that the method 500 in FIG. 5 is presented from the perspective of a different vehicle than the ego vehicle in the method 400 of FIG. 4. More particularly, the method 500 is presented from the point of view of what was called the other vehicle in the method 400. Thus, the ego vehicle in the method 400 is now considered to be the other vehicle in the method 500. Similarly, the other vehicle in the method 400 is now considered to be the ego vehicle in the method 500. Again, the term "ego" is used to note the vehicle from whose point of view the actions are being presented. The method 500 is presented from the point of view of an ego vehicle that receives sensor data, a portion of which is in a compressed format, from an other vehicle. At block 510, first environment data can be acquired for at least a portion of an external environment of the ego vehicle 200. The first environment data can be acquired by the sensors in/on the ego vehicle 200. The method 500 can continue to block 520.

At block 520, a data summary based the first environment data can be generated. The data summary can be generated by the SSDS module(s) 132. The data summary can be generated in response to a request or periodically. The data summary can be transmitted to an other vehicle 140 and/or another entity such as by the transceiver(s) 230. The method 500 can continue to block 530.

At block 530, a first portion of second environment data and a second portion of the second environment data can be received from the other vehicle 140, such as by the transceiver(s) 230 or the ego vehicle 200. The first portion and second portion of the second environment data can be received in response to a request, unilaterally sent by the other vehicle, or at any other time. The second environment data can be at least a portion of an external environment of the other vehicle. A resolution level of the first portion can be lower than a resolution level of the second portion, and the second portion can be a remainder of the second environment data excluding the first portion. The method 500 can continue to block 540.

At block 540, the first portion, the second portion, and the first environment data can be fused together. In one or more arrangements, the first portion, the second portion, and the first environment data can be fused together by the SDF module(s). The method 500 can end. Alternatively, the method 500 can return to block 510 or some other block. The method 500 can be repeated at any suitable point, such as at a suitable time or upon the occurrence of any suitable event or condition.

Figure 6:
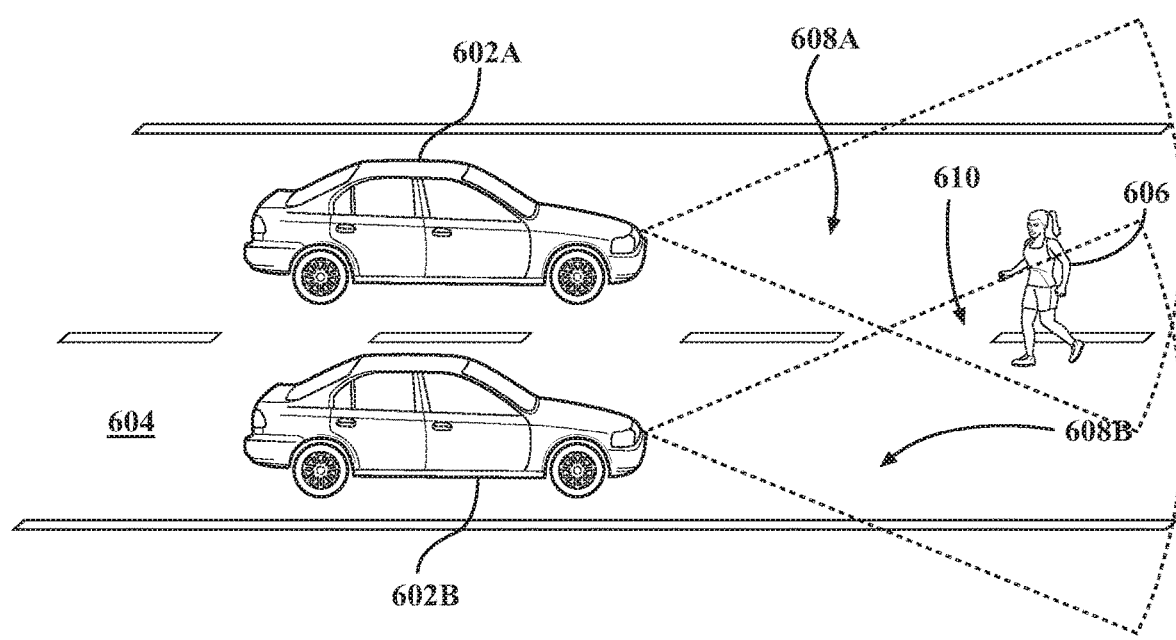
FIG. 6 is an example of a scenario in which sensor data is shared between an ego vehicle and an other vehicle.

A non-limiting example of the sensor data sharing between two vehicles will now be described in relation to FIG. 6. FIG. 6 shows an example of a scenario in which sensor data is shared between the vehicles 602A, 602B. Each of the vehicles 602A, 602B can be similar to the ego vehicle 200 shown in FIG. 2. The vehicles 602A, 602B can be traveling on a road 604, while a person 606 is crossing the road 604. The vehicles 602A, 602B can be communicatively coupled by the one or more communication network(s) 150.

The vehicle 602A can use one or more sensors 240 (such as one or more cameras 246) to acquire first environment data of at least a portion 608A of the external environment of the vehicle 602A. The vehicle 602B can use one or more sensors 240 (such as one or more cameras 246) to acquire second environment data of at least a portion 608B of the external environment of the vehicle 602B.

The vehicle 602B can generate a data summary based on the second environment data. More specifically, the SSDS module(s) 282 can generate the data summary based on the second environment data. The data summary can include information about the portion 608B such as characteristics of the space in the portion 608B and information about the sensors used to capture the space in the portion 608B. The information about the sensors 240 can include the sensor coverage area and the type of sensors. The data summary can further include information about the person 606 crossing the road 604. The vehicle 602B can transmit the data summary to the vehicle 602A using the transceiver(s) 230 and as an example, DSRC communications technology. The vehicle 602A can receive the data summary from the vehicle 602B using the transceiver(s) 230.

The vehicle 602A can determine a common region of sensor coverage by the two vehicles 602A, 602B. The vehicle 602A can determine whether any objects identified in the data summary is present in the first environment data. The vehicle 602A can analyze the characteristics of the data summary and the portion 608A of the external environment of the vehicle 602A. In this example, the data summary includes information about the person 606 and the first environment data includes information about the person 606. As such, the portions 608A, 608B overlap and there is a common region 610 of sensor coverage for the vehicles 602A, 602B.

The vehicle 602A can identify the first environment data that is located in the common region 610, such the first environment data that includes the person 606. The vehicle 602A can reduce the resolution of the first portion of the first environment data that is located in the common region 610. As an example, the vehicle 602A can downsample the first portion using a Canny edge detector. In some instances, the vehicle 602A can also compress the first portion using a neural network encoder/decoder and/or any suitable compression method.

The vehicle 602A can transmit the first portion that has been downsampled and/or compressed as well as a second portion of the first environment data which is the remainder of the first environment data excluding the first portion.

The vehicle 602B can receive the first portion that has been downsampled and/or compressed and the second portion of the first environment data. In the case where the first portion is compressed, the vehicle 602B can decompress the first portion.

The vehicle 602B can fuse together the first portion, the second portion and the second environment data by aligning objects that are common to both the first portion and the second environment data. As an example, the vehicle 602B can align an outline of the person 606 as found in the first portion with the image of the person 606 as found in the second environment data.

It will be appreciated that arrangements described herein can provide numerous benefits, including one or more of the benefits mentioned herein. For example, arrangements described herein can provide a larger view of the external environment of a vehicle. Arrangements described herein can enable a driver and/or an autonomous vehicle to perceive the external environment beyond the scope of the vehicle sensor(s). Arrangements described herein can reduce the bandwidth required to wirelessly transfer sensor data between vehicles. Arrangements described herein can take advantage of vehicle-to-vehicle (V2V) communication or vehicle-to-infrastructure (V2I) communication. Arrangements described herein can result in some or all of the computing processes being conducted on a server and/or an ego vehicle. Arrangements described herein can improve safety, mobility, and sustainability within a driving environment.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for sharing sensor data, the method comprising:
    acquiring, using one or more sensors of an ego vehicle, first environment data of at least a portion of an external environment of the ego vehicle, the first environment data being at an acquired resolution level;
    receiving, from an other vehicle, a data summary based on second environment data of at least a portion of an external environment of the other vehicle;
    determining whether there is a common region of sensor coverage of the external environment based on the first environment data and the data summary;
    responsive to determining that there is a common region of sensor coverage of the external environment, identifying the first environment data that is located within the common region, the first environment data that is located within the common region being a first portion of the first environment data;
    reducing a resolution level of the first portion to a reduced resolution level, the reduced resolution level being lower than the acquired resolution level; and
    transmitting, to the other vehicle, the first portion at the reduced resolution level and a second portion of the first environment data, the second portion being a remainder of the first environment data excluding the first portion.

2. The method of claim 1, wherein transmitting, to the other vehicle, the first portion at the reduced resolution level and the second portion includes transmitting, to the other vehicle, the second portion at the acquired resolution level.

3. The method of claim 1, wherein reducing the resolution level of the first portion to the reduced resolution level includes downsampling the first portion to the reduced resolution level.

4. The method of claim 3, wherein reducing the resolution level of the first portion to the reduced resolution level includes compressing the first portion.

5. The method of claim 1, wherein the data summary includes at least one of:
one or more detected objects; and
information about one or more sensors of the other vehicle.

6. The method of claim 5, wherein determining whether there is a common region of the sensor coverage of the external environment includes estimating an area of spatial-temporal correlation between the one or more sensors of the ego vehicle and the one or more sensors of the other vehicle.

7. A method for sharing sensor data, the method comprising:
acquiring, using one or more sensors of an ego vehicle, first environment data of at least a portion of an external environment of the ego vehicle;
transmitting, by the ego vehicle, a data summary based on the first environment data;
receiving, by the ego vehicle and from an other vehicle, a first portion of second environment data and a second portion of the second environment data, the second environment data being of at least a portion of an external environment of the other vehicle, a resolution level of the first portion being lower than a resolution level of the second portion, the second portion being a remainder of the second environment data excluding the first portion; and
fusing the first portion, the second portion, and the first environment data.

8. The method of claim 7, wherein the first portion is compressed and further comprising decompressing the first portion.

9. The method of claim 7, wherein the second portion is compressed and further comprising decompressing the second portion.

10. The method of claim 7, wherein fusing the first portion, the second portion, and the first environment data includes aligning markers in the first portion and the first environment data.

11. The method of claim 7, wherein the data summary includes at least one of:
one or more detected objects; and
information about one or more sensors of the ego vehicle.

12. A system for sharing sensor data, the system comprising:
one or more sensors, the one or more sensors being configured to acquire first environment data of at least a portion of an external environment of an ego vehicle, the first environment data being at an acquired resolution level;
one or more processors, the one or more processors being programmed to initiate executable operations comprising:
receiving, from an other vehicle, a data summary based on second environment data of at least a portion of an external environment of the other vehicle;
determining whether there is a common region of sensor coverage of the external environment based on the first environment data and the data summary;
responsive to determining that there is a common region of sensor coverage of the external environment, identifying the first environment data that is located within the common region, the first environment data that is located within the common region being a first portion of the first environment data;
reducing a resolution level of the first portion to a reduced resolution level, the reduced resolution level being lower than the acquired resolution level; and
transmitting, to the other vehicle, the first portion at the reduced resolution level and a second portion of the first environment data, the second portion being a remainder of the first environment data excluding the first portion.

13. The system of claim 12, wherein transmitting, to the other vehicle, the first portion at the reduced resolution level and the second portion includes transmitting, to the other vehicle, the second portion at the acquired resolution level.

14. The system of claim 12, wherein reducing the resolution level of the first portion to the reduced resolution level includes downsampling the first portion to the reduced resolution level.

15. The system of claim 12, wherein reducing the resolution level of the first portion to the reduced resolution level includes compressing the first portion.

16. The system of claim 12, wherein determining whether there is a common region of the sensor coverage of the external environment includes estimating an area of spatial-temporal correlation between the one or more sensors of the ego vehicle and the one or more sensors of the other vehicle.

17. A system for sharing sensor data, the system comprising:
one or more sensors, the one or more sensors being configured to acquire first environment data of at least a portion of an external environment of an ego vehicle;
one or more processors, the one or more processors being programmed to initiate executable operations comprising:
transmitting, by the ego vehicle, a data summary based on the first environment data;
receiving, by the ego vehicle and from an other vehicle, a first portion of second environment data and a second portion of the second environment data, the second environment data being of at least a portion of an external environment of the other vehicle, a resolution level of the first portion being lower than a resolution level of the second portion, the second portion being a remainder of the second environment data excluding the first portion; and
fusing the first portion, the second portion, and the first environment data.

18. The system of claim 17, wherein the first portion is compressed and further comprising decompressing the first portion.

19. The system of claim 17, wherein the second portion is compressed and further comprising decompressing the second portion.

20. The system of claim 17, wherein fusing the first portion, the second portion, and the first environment data includes aligning markers in the first portion and the first environment data.

* * * * *